(12) United States Patent
Sprague

(10) Patent No.: US 11,692,370 B2
(45) Date of Patent: *Jul. 4, 2023

(54) TAPER-LOC SYSTEM IMPROVEMENTS

(71) Applicant: C.R. Laurence Co., Inc., Los Angeles, CA (US)

(72) Inventor: Gary Sprague, Los Angeles, CA (US)

(73) Assignee: C.R. LAURENCE CO., INC., Los Angeles, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/182,847

(22) Filed: Feb. 23, 2021

(65) Prior Publication Data

US 2021/0180359 A1 Jun. 17, 2021

Related U.S. Application Data

(63) Continuation of application No. 15/788,616, filed on Oct. 19, 2017, now Pat. No. 10,934,743.

(Continued)

(51) Int. Cl.
*E04H 17/16* (2006.01)
*F16J 15/02* (2006.01)
(Continued)

(52) U.S. Cl.
CPC ........ *E04H 17/168* (2013.01); *E04F 11/1817* (2013.01); *E04F 11/1853* (2013.01);
(Continued)

(58) Field of Classification Search
CPC ............... E04F 11/1817; E04F 11/1853; E04F 2011/1823; E06B 3/5454; E04H 17/168; F16J 15/025; F16J 15/027; F16J 15/061
See application file for complete search history.

(56) References Cited

U.S. PATENT DOCUMENTS 3,492,770 A 2/1970 Furner
4,944,984 A 7/1990 Kunert
(Continued)

FOREIGN PATENT DOCUMENTS

AU 2012202256 82 1/2015
DE 299 01 960 U1 6/1999
(Continued)

OTHER PUBLICATIONS

USPTO, International Search Report and Written Opinion issued in related International Patent Application No. PCT/US2017/57706 dated Mar. 1, 2018, 17 pages.

(Continued)

*Primary Examiner* — Matthew R McMahon
(74) *Attorney, Agent, or Firm* — Cislo & Thomas, LLP

(57) ABSTRACT

An improved base shoe for use with panel installation removal systems. The improved base shoe includes dovetail grooves for use with a safety-seal and a weather seal, wherein the safety-seal and weather seal must be installed prior to installing a glass panel. The improved base shoe features a recess for use with taper plates having a continuous projection along an upper surface. The base shoe and taper plates are configured so as to provide a prying surface between the projection on the taper plates and a wall of the base shoe.

19 Claims, 9 Drawing Sheets

Related U.S. Application Data

(60) Provisional application No. 62/411,347, filed on Oct. 21, 2016.

(51) Int. Cl.
*E04F 11/18* (2006.01)
*F16J 15/06* (2006.01)
*E06B 3/54* (2006.01)

(52) U.S. Cl.
CPC .......... *E06B 3/5454* (2013.01); *F16J 15/025* (2013.01); *F16J 15/027* (2013.01); *F16J 15/061* (2013.01); *E04F 2011/1823* (2013.01)

(56) References Cited

U.S. PATENT DOCUMENTS

| | | |
|---|---|---|
| 4,987,699 A | 1/1991 | Gold |
| 5,203,115 A | 4/1993 | Marinoni |
| 6,581,342 B1 * | 6/2003 | Tavivian ............... E06B 3/5454 52/204.597 |
| 7,559,536 B1 | 7/2009 | Hansen |
| 7,765,751 B2 | 8/2010 | Vukovic et al. |
| 7,866,636 B1 | 1/2011 | Hansen |
| 8,776,477 B2 | 7/2014 | Sprague |
| 8,820,721 B1 | 9/2014 | Poma et al. |
| 9,284,770 B2 | 3/2016 | Sprague |
| 9,303,444 B1 | 4/2016 | Choi |
| 9,657,760 B2 | 5/2017 | Giacometti et al. |
| 10,871,026 B1 * | 12/2020 | Mourchid ............. E06B 3/5409 |
| 2002/0100234 A1 | 8/2002 | Sprague |
| 2002/0195595 A1 | 12/2002 | Shepherd |
| 2009/0031653 A1 | 2/2009 | Nash |
| 2011/0154633 A1 | 6/2011 | Sprague |
| 2011/0225925 A1 | 9/2011 | Sprague |
| 2015/0110552 A1 | 4/2015 | Yang |
| 2017/0292274 A1 | 10/2017 | Downs |
| 2019/0218786 A1 * | 7/2019 | Bieler ................. E04F 11/1853 |

FOREIGN PATENT DOCUMENTS

| | | | |
|---|---|---|---|
| EP | 1 405 979 A1 | 4/2004 | |
| EP | 1405979 A1 * | 4/2004 | ............... E06B 3/02 |
| EP | 2136026 A1 | 12/2009 | |
| EP | 3009580 A1 | 4/2016 | |
| ES | 1164783 U | 9/2016 | |
| FR | 2686963 A1 | 8/1993 | |
| WO | 2015047109 A1 | 4/2015 | |
| WO | 2015092701 A1 | 6/2015 | |
| WO | 2015145373 A1 | 10/2015 | |

OTHER PUBLICATIONS

Supplementary European Search report dated Feb. 18, 2020 received by the European Patent Office, 11 pages.

* cited by examiner

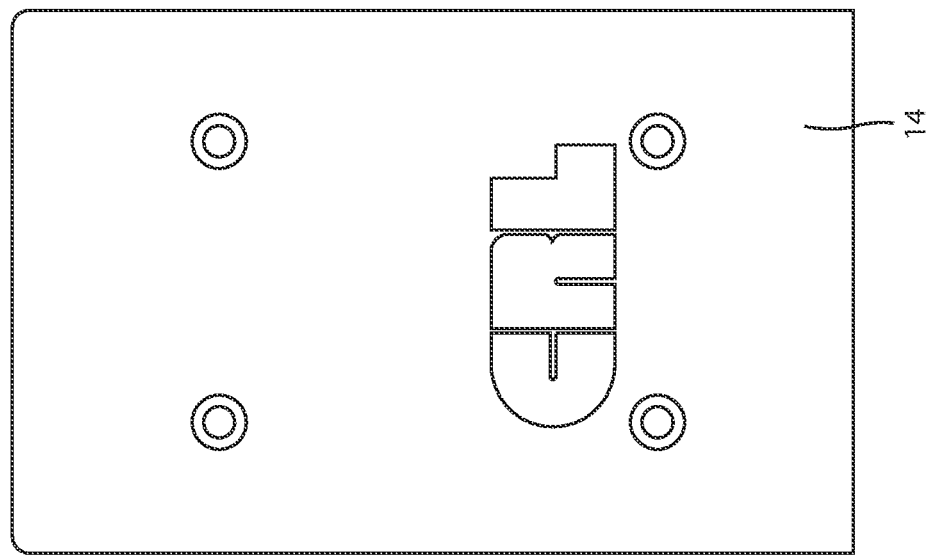
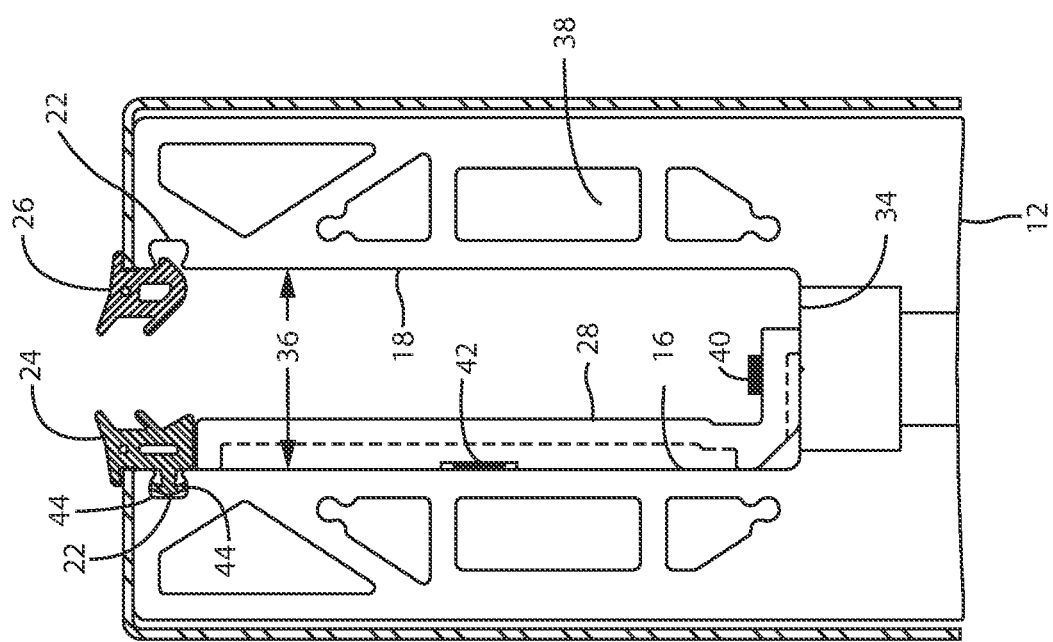

TAPER-LOC SYSTEM IMPROVEMENTS

CROSS REFERENCE TO RELATED APPLICATIONS

This patent application claims the benefit of U.S. patent application Ser. No. 15/788,616 entitled Taper-Loc System Improvements, filed Oct. 19, 2017, (expected to issue as U.S. Pat. No. 10,934,743 on Mar. 2, 2021), and to U.S. Provisional Patent Application Ser. No. 62/411,347, titled "Taper-Loc System Improvements," filed Oct. 21, 2016, both of which are incorporated in their entirety by this reference.

BACKGROUND OF THE INVENTION

Field of the Invention

The present invention relates generally to panel installation and removal systems and more particularly to improvements to the panel installation and removal system described in U.S. Pat. No. 8,122,654 ("the '654 patent") and U.S. Pat. No. 8,201,366 ("the '366 patent"), the commercial embodiments of which are referred to as the "Taper-Loc" system.

BACKGROUND OF THE INVENTION

Glass panel railing systems are used in commercial spaces and homes, and frequently are desired due to an attractive appearance derived from transparent or translucent properties. They typically are used as guard rails for walk ways in the proximity of commercial facilities and as barriers at the edges of physical drop offs for the protection of pedestrians, as well as for partitioning interior spaces in commercial buildings. Known glass panel systems include vertical panels and a base shoe assembly. The bottom edges of the panels are installed in the base shoe assembly while the top edges may support a top rail or handrail. Installation of the bottom edges of glass panels into a base shoe assembly however can be difficult, expensive and time-consuming.

Prior to the development of the Taper-Loc system as described in the '654 and '366 patents, glass panel installation systems and methodology suffered from a number of disadvantages. Some systems required cement to hold the panels in place in a base shoe. Due to the quick setting nature of the cement, often installers lacked sufficient time to place the panels in a base shoe, align the panels and ensure that the cement maintained a smooth and attractive appearance. Another drawback of this system was that adjustments to a panel's final position were essentially impossible after the cement had set.

Other commonly employed systems involved driving a wedge vertically into a base shoe, typically using a hammer and punch, and thereby wedging the glass panel into the base shoe. Systems of this type however, lacked a precise way to control the degree of clamping force used to secure a panel in the base shoe. Moreover, the base shoe's decorative cladding q was prone to damage during insertion of the wedge and particularly during any attempted removal of the wedge for adjustment of the glass panel or replacement. In addition, an errant blow of the hammer could damage either the glass panel, base shoe or both.

With the development of the Taper-Loc system as described in the '654 and '366 patents, the problems associated with the prior art systems for installing glass panels in a base shoe were largely eliminated. Essentially, the Taper-Loc system comprises a base shoe or rail, spacers, a glass panel and taper plates. The components as depicted in the patents may be described as follows. The base shoe comprises a rail for holding a glass panel. The base shoe is in the form of an aluminum c-channel style extrusion with relatively thick side walls. Set within the channel of the base shoe against one wall and the floor of the channel are spacers. The spacers are typically set within the shoe at intervals along the length of the base shoe. The spacers are made of plastic and serve to prevent the glass panel from directly contacting the aluminum wall or bottom surface of the base shoe. The spacers may be attached to the base shoe by means of double-sided adhesive tape.

The taper plates are tapered plates that are designed to engage at their thinnest ends and slide against each other such that the combined thickness of the plates increases as the plates engage along their length. The maximum combined thickness of the plates is achieved when the plates are fully overlapping. The plates include projection tabs that allow them to be used with a special tool which both drives the plates together upon installation of a glass panel in a base shoe and also functions to separate the plates in the event a shoe or panel requires replacement. The taper plates will typically be fabricated from steel or aluminum, but other metallic materials and some plastic materials are also suitable.

In a typical assembly, the spacers are glued at intervals to the base shoe, a glass panel is inserted in the shoe and rests upon and against the spacers. A pair of taper plates, where one pair of taper plates corresponds to each spacer, are located on the opposite side of the glass panel, and are positioned in the shoe with the thin edges of the plates partially overlapping. A side of one of the taper plates contacts the wall of the glass panel, whereas a side of the other taper plate contacts the wall of the shoe. The shoe-side taper plate is stationary. When the taper plates are driven together, the glass-side plate slides along the length of the stationary shoe-side plate.

As the taper plates are driven to their fully overlapped configuration, compressive force builds up between the taper plates, glass panel, spacer and the walls of the base shoe so as to secure the base shoe to the glass panel. Thereafter, press-in seals are typically installed on both sides of the base shoe to glass plate interface.

Though the above-described Taper-Loc system has dramatically improved upon the systems of the prior art, certain drawbacks of the system have been uncovered during use. In particular, installers will often install a base shoe, glass panel and rail assembly while saving the task of installing weather seals on the base shoe to seal the shoe to glass panel interface or seam as the last part of the installation job. This often results in installers leaning out over an installed rail assembly, without wearing a safety harness, to press in the outboard weather seal, thus creating a potentially unsafe condition where an installer could potentially fall over a rail and sustain injury.

Another issue that has been observed on job sites is that installers have discovered that when it is desired to remove a base shoe from a glass panel, the insertion force of the taper plates upon initial installation causes the base shoe-side taper plate to stick to the base shoe and become quite difficult to remove from the base shoe. The use of silicone sealant at the taper plate interface, as some installers are want to do, compounds this problem. The problem may significantly increase the time required by installers to replace base shoes or glass panels on a job site.

What is needed therefore is a revised base shoe that requires at least one weather seal to be installed prior to the installation of a glass panel in the shoe and thereby eliminate problem where some installers incur safety risks by leaning out over an installed rail assembly for the purpose of installing a press-in outboard whether seal. It would also be desirable to provide a revised taper plate and base shoe design that includes provisions for removing a previously installed taper plate which is adhered or stuck to a wall of the base shoe.

SUMMARY OF THE INVENTION

The improved base shoe or rail of the present invention features a dovetail groove formed into an interior face of an outboard vertical side wall of the base shoe. The dovetail groove allows for the use of a weather seal configured with two projections which engage the interior side walls of the dovetail groove. Due to the nature of this design, the outboard weather seal must be inserted into the dovetail groove prior to the insertion of the glass pane into the base shoe, i.e. the weather seal cannot be inserted, or at least is quite difficult to insert, in the base shoe after installation of the glass panel. This design is advantageous from a safety viewpoint because it requires the outboard weather seal to be installed prior to installation of the glass panel and therefore eliminates safety risk, i.e. the risk of falling, that occurs when installers reach over an installed railing to install press-in seals at the outboard glass panel to base shoe interface.

Another improvement to the base shoe and taper plate assembly of the present invention regards replacing the plurality of spacers used at intervals on the base shoe with a continuous setting strip which would serve the function of the spacers, i.e. preventing contact between the glass panel and the interior face of the outboard wall of the base shoe. Universal setting block tape strips have also been added to attach the setting block to the base shoe and the glass panel to the setting block. The continuous setting strip and tape strips provide increased efficiency in installation by eliminating the need to glue in place numerous individual spacers.

The improved base shoe and taper plates of the present invention further improve upon the prior art by presenting a taper plate design that features a continuous projection or tab along a top surface of the taper plate where the projection rests upon a recess formed into an interior face of an inboard vertical side wall of the base shoe. The taper plate, equipped with the projection, and the depth of the recess in the base shoe, are configured such that there is a small gap between the edge of the projection and the interior face of the inboard side wall of the base shoe. The projection in combination with the gap between it and the interior face of the inboard vertical side wall provides a prying surface that allows an installer to insert a chisel, pry bar or even a screwdriver into the gap and pry against the projection to separate the taper plate from the inboard side wall of the base shoe.

The above and other features of the invention will become more apparent from the following detailed description.

BRIEF DESCRIPTION OF THE DRAWINGS

FIG. 2 is another sectional view of a base shoe of the present invention shown in FIG. 1.

FIG. 3 is a side view of decorative cladding that may be applied to the base shoe of the present invention.

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 4:
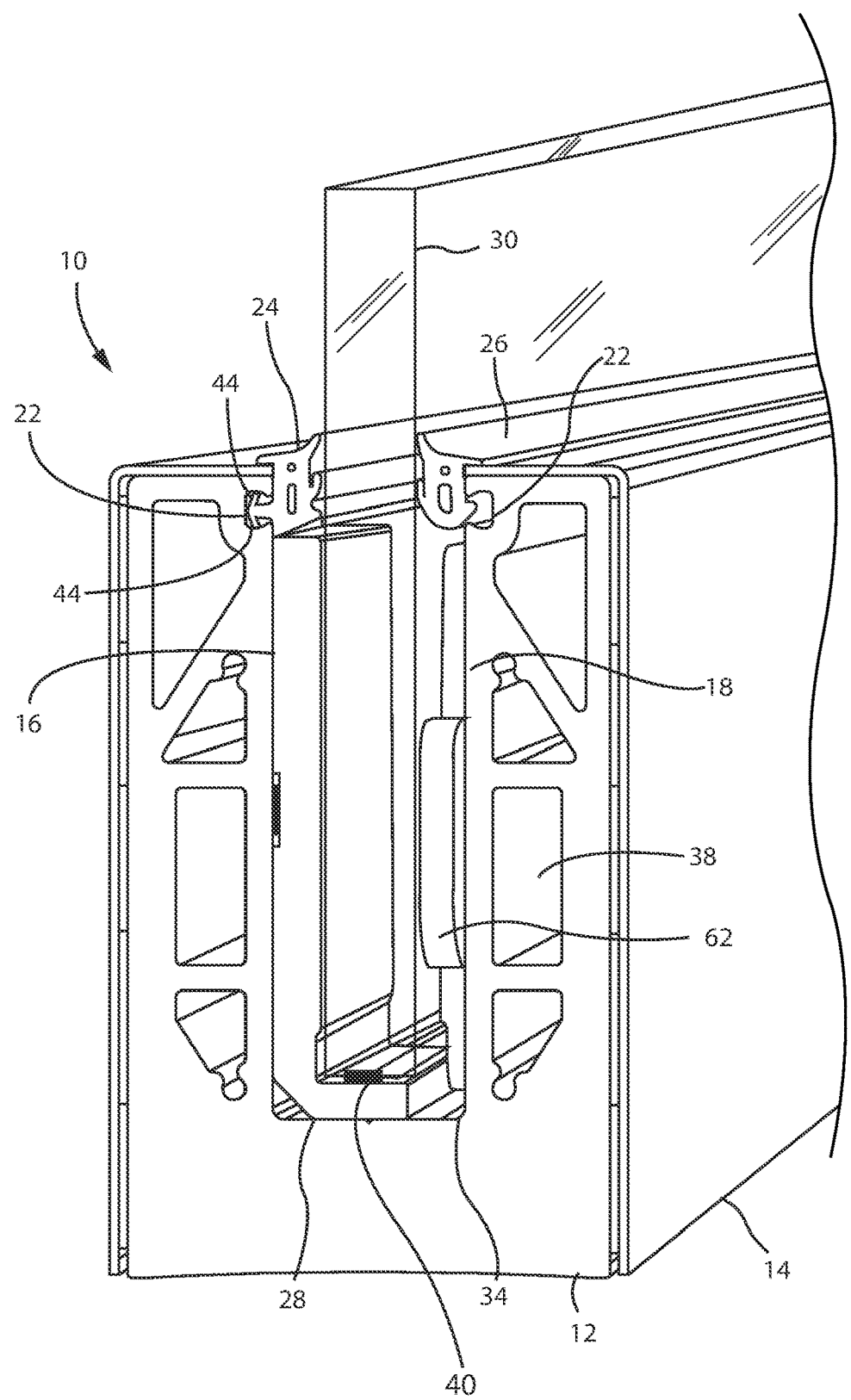
FIG. 4 is a perspective view of the base shoe of FIG. 1 showing a glass panel installed in an embodiment of the present invention.

With reference to FIG. 4, an embodiment of the improved base shoe assembly 10 of the present invention is shown. The base shoe assembly 10 features a base shoe 12 in the form of a channel section, which may be surrounded by decorative cladding 14. Inserted in the base shoe 12 is a safety weather seal 24 and a press-in weather seal 26, a continuous glass setting strip 28, a glass panel 30 and a pair of taper plates 62 which secure the panel 30 in the base shoe 12.

Figure 1:
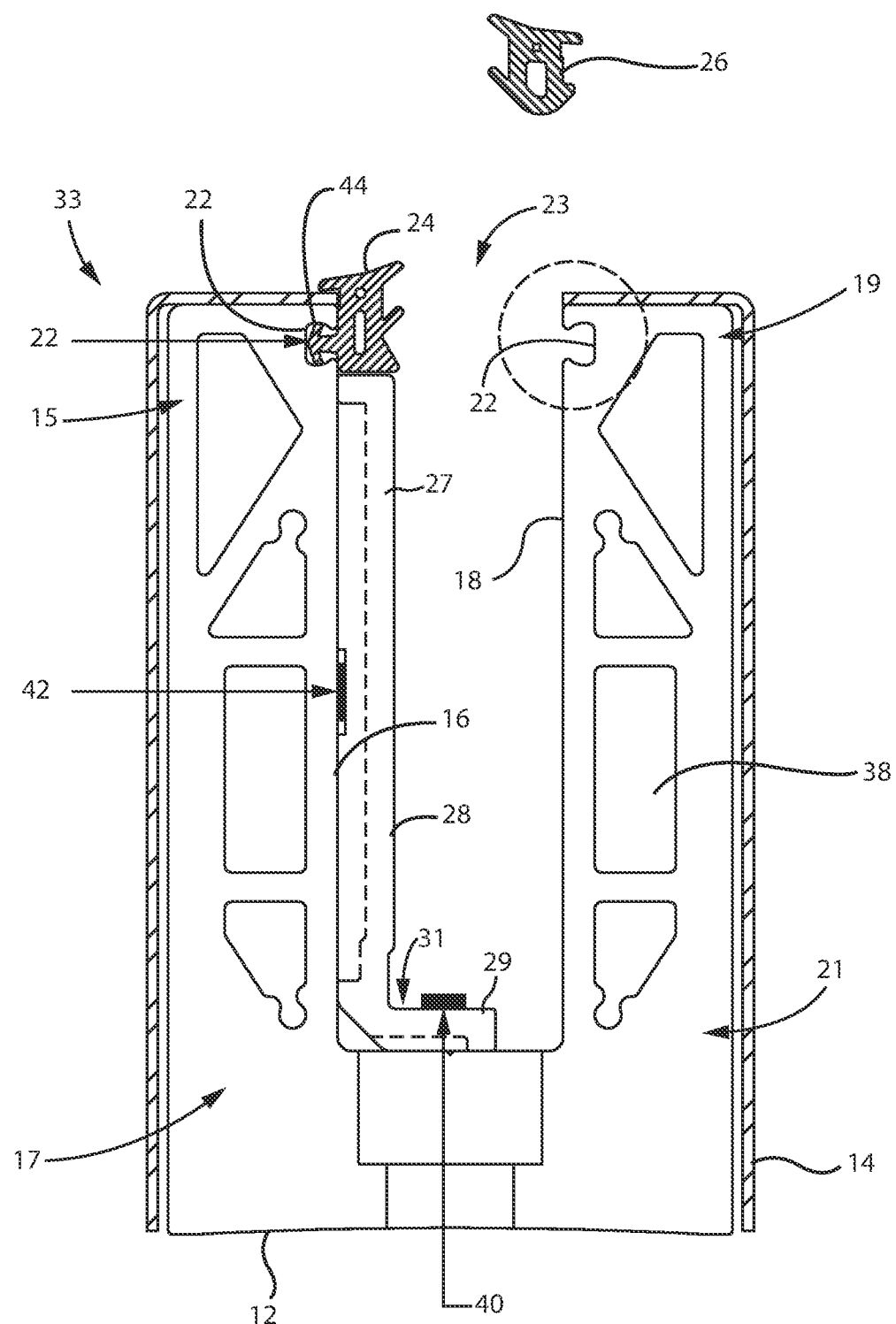
FIG. 1 is an elevation view of a base shoe of the present invention which incorporates dovetail grooves for weather seals with some parts removed for clarity.

With reference to FIGS. 1 and 2, the base shoe 12 features a first inner side wall 16 having a top side 15 and a bottom side 17 opposite the top side 15, a second inner side wall 18 also having a top side 19 and a bottom side 21 opposite the top side 19, and a bottom wall 34 adjacent to the bottom side 17 of the first inner side wall 16 and the bottom side 21 of the second inner side wall 18, the first inner side wall 16, the second inner side wall 18, and the bottom wall 34 defining a base shoe channel 36 therebetween. The top side 15 of the first inner side wall 16 and the top side 19 of the second inner side wall 18 define an opening 23. The base shoe 12 may, optionally, be formed with a plurality of lightening passages 38 which may be of a variety of cross-sectional shapes and serve to reduce the weight of the base shoe 12. The base shoe 12 may also includes a dovetail groove 22 formed into each of the first and second inner side walls 16, 18, near the opening 23 of the channel 36. The dovetail grooves 22 are configured to accept either the safety weather seal 24 or the press-in weather seal 26.

A continuous setting strip 28 may be installed in the base shoe 12. The continuous setting strip 28, typically made of plastic, is preferably of L-shaped configuration and supports and protects the glass panel 30 from contact with the metallic walls of the base shoe 12. As such, the continuous setting strip 28 has a top arm 27 and a bottom arm 29 projecting perpendicularly from the top arm 27. In some embodiments, the top arm 27 and the bottom arm 29 may be two separate pieces. The continuous setting strip 28 improves upon the prior design disclosed in the '654 patent and '366 patents by replacing a plurality of individual setting blocks which formerly supported and protected the glass panel 30. The continuous setting strip 28 may be secured to the first inner wall 16 of the base shoe by a continuous tape strip 42. The continuous tape strip 42 improves upon the design shown in the '654 and '366 patents by eliminating the need to individually glue the formerly used setting blocks into place.

The improved base shoe 12 also features another continuous tape strip 40 placed on the top side 31 of the bottom arm 29 of the L-shaped surface of the continuous setting strip 28. The continuous tape strip 40 assists in securing the glass panel 30 to the continuous setting strip 28. The continuous tape strips 40, 42 may comprise double-sided adhesive tape.

As referenced above, the improved base shoe 12 of the present invention features dovetail grooves 22 formed into first inner side wall 16 and the second inner side wall 18 of the base shoe 12 near their respective top sides 15, 19. The dovetail groove 22 allows for the use of the safety weather seal 24 which will be typically located on an outboard facing side 33 of a fully assembled base shoe assembly 10. The safety weather seal 24 is configured with two projections 44 which engage the interior side walls of the dovetail groove 22. Due to the nature of this design, the safety weather seal 24 must be inserted into the dovetail groove 22 prior to the insertion of a glass panel 30 into the base shoe 12, i.e. the weather seal 24 cannot properly be inserted in the base shoe 12 after installation of the glass panel 30. This design is advantageous from a safety viewpoint.

Frequently, glass walls rill be installed at the border of drop-offs. With the previous press-in seal design (as referenced in the '366 and '654 patents), it has been observed that some installers have a habit of installing the weather seals as the last step in the installation. This requires an installer to lean over the glass wall to install the outboard weather seal which presents a safety risk. The new safety weather seal 24 eliminates this risk because it cannot be inserted after a glass panel 30 has been installed in the base shoe 12. Because the safety weather seal 24 must be installed prior to installation of a glass panel 30, it eliminates the risk of falling that occurs when installer reaches over an installed railing to install the safety weather seal 24 at the outboard side of the glass panel to the base shoe interface.

Figure 5:
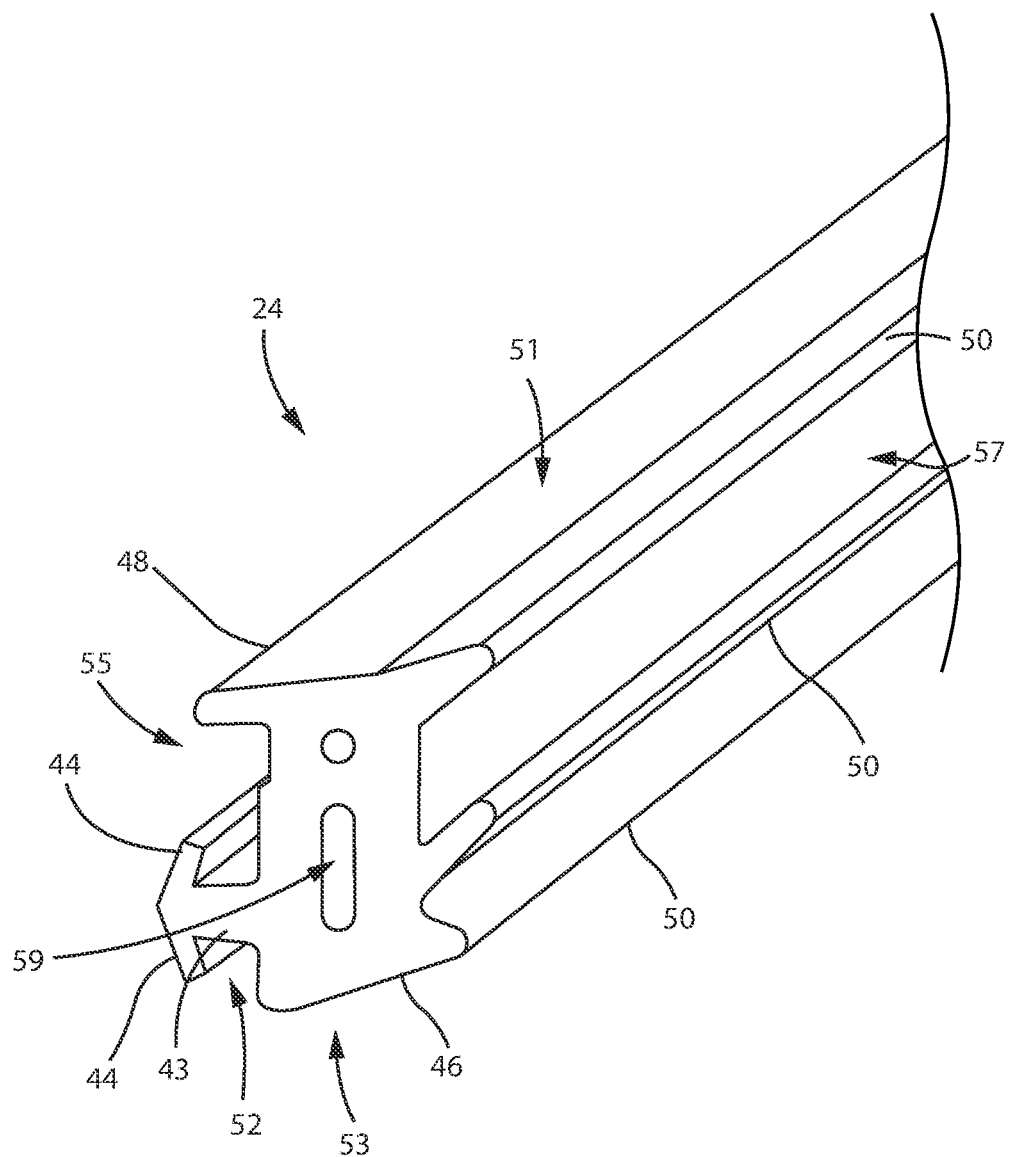
FIG. 5 is a close up perspective view of an embodiment of the weather seal.

With reference to FIG. 5, an enlarged perspective view of the safety weather seal 24 of the present invention base shoe assembly 10 is shown. The safety weather seal 24 includes a body section 46 having a top side 51, a bottom side 53 opposite the top side 51, a lateral side 55 adjacent to the top side 51 and the bottom side 53, and a medial side 57 opposite the lateral side 55 and adjacent to the top side 51 and the bottom side 53. The lateral side 55 of the safety weather seal 24 interfaces with the first inner side wall 16 and the medial side 57 interfaces with the glass panel 30.

In preferred embodiment, the bottom side 53 is non-parallel to the top side 51. Specifically, moving from the lateral side 55 to the medial side 57, the bottom side 53 may angle towards the top side 51. Therefore, the lateral side 55 may be taller than the medial side 57 as shown in FIG. 5. The body section 46 may further comprise one or more safety weather seal channels 59 extending the length of the body section 46 to facilitate compressibility of the body section 46.

Extending from the lateral side 55 of the body section 46 is a dovetail groove engagement portion 52 which terminates with a pair of opposing projections 44. The projections 44 are connected to the body section 46 by a stem 43. The projections 44 may form a 90 degree angle with the stem 43.

In the preferred embodiment, the projections 44 form an oblique angle with the stem 43. More preferably, the projections 44 form an acute angle with the stem 43, thereby creating an arrow shape when viewed in cross-section.

The safety weather seal 24 also includes at least one glass scraper seal 50 protruding from the medial side 57. The embodiment shown in FIG. 5 comprises three glass scraper seals 50. In the preferred embodiment, at least one of the glass scraper seals 50 may be angled towards the top side 51.

Figure 6:
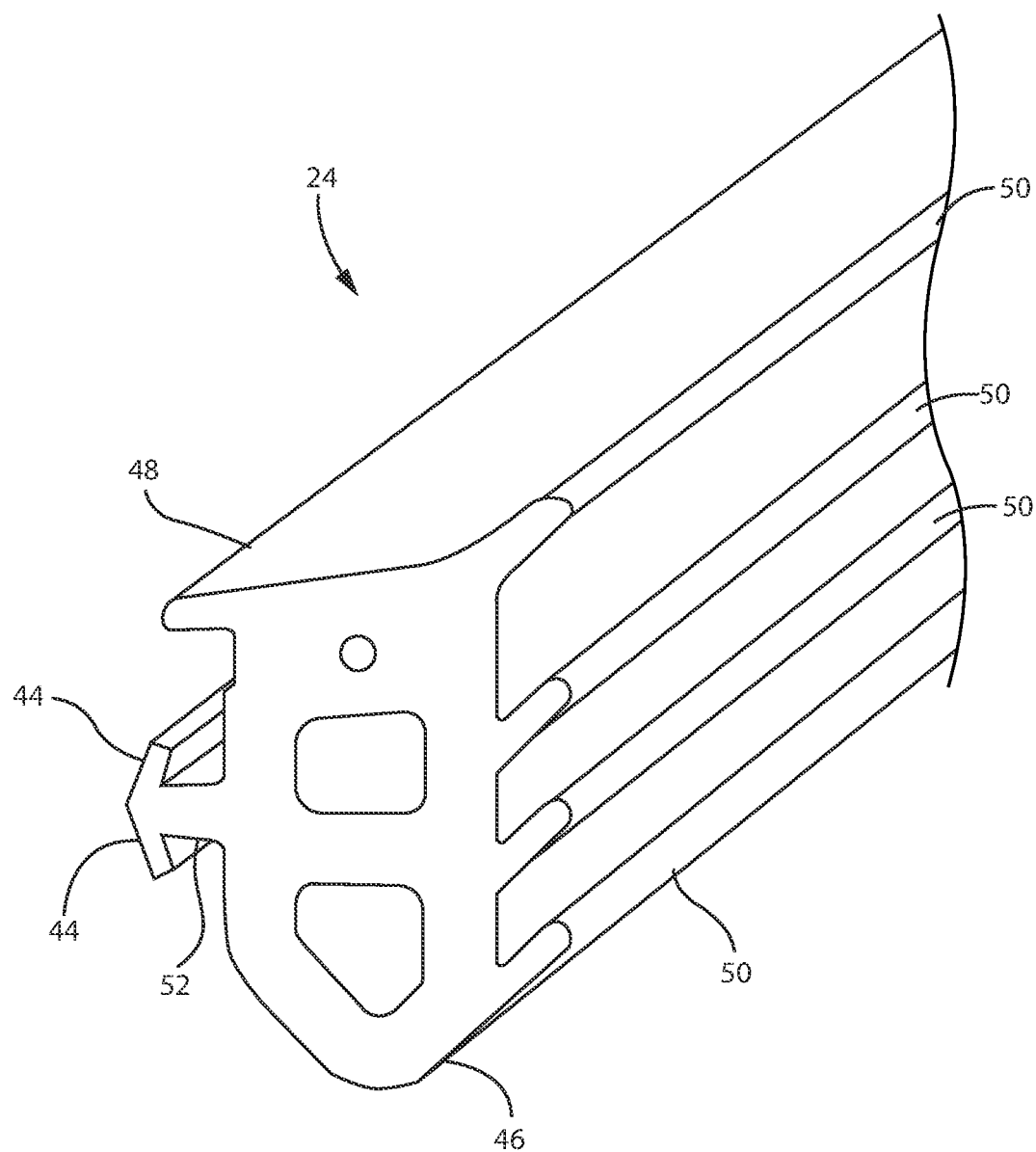
FIG. 6 is a close up perspective view of another embodiment of the weather seal.

FIG. 6 shows the safety weather seal 24 with four glass scraper seals 50. In addition, the bottom side 53, rather than being flat, is tapered.

On the lateral side 55, the safety weather seal 24 also includes a lateral lip 48 adjacent to the dovetail groove engagement portion 52. The lateral lip 48 covers a gap at the outboard glass panel 30 to base shoe 12 interface.

Figure 7:
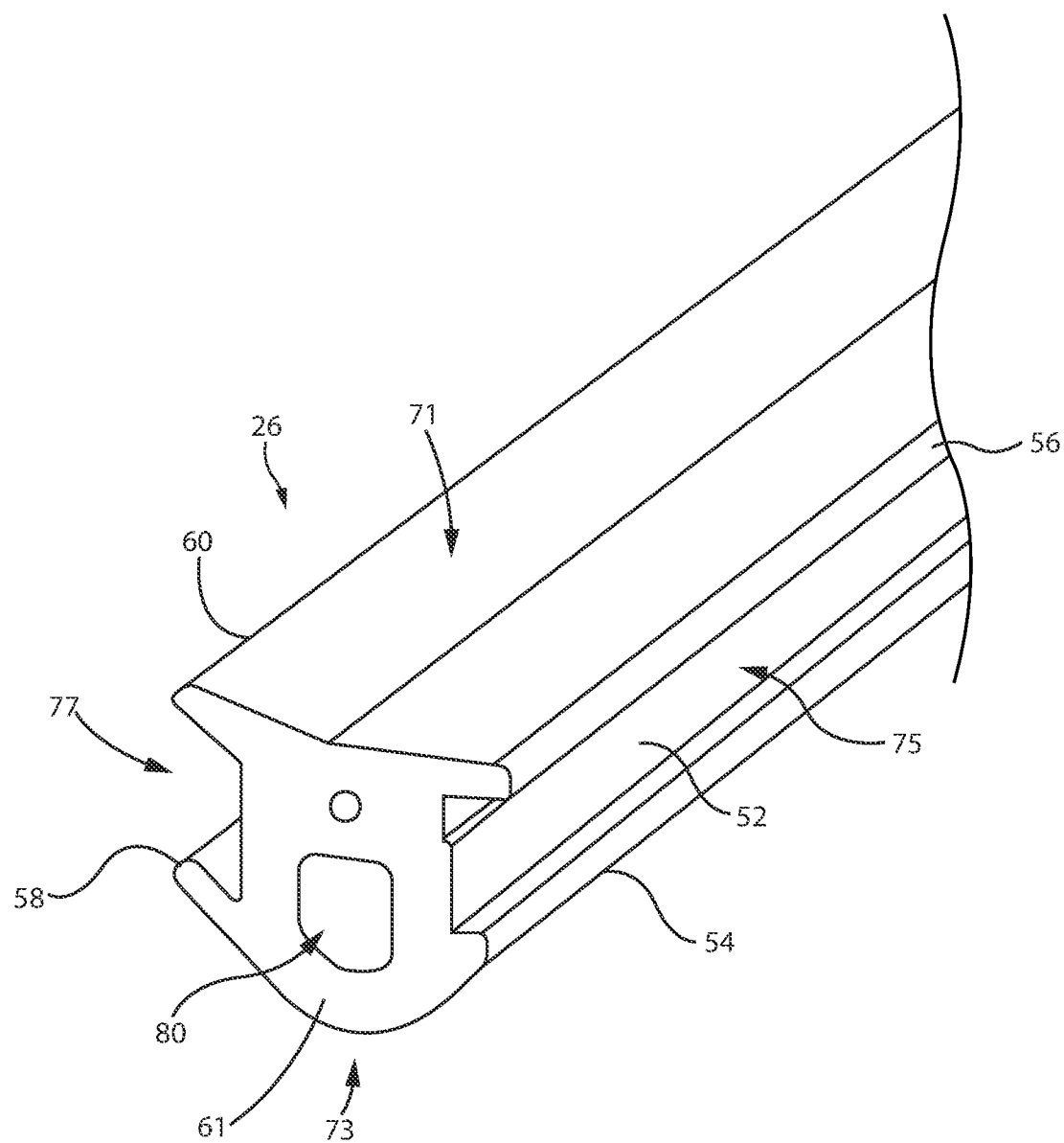
FIG. 7 is a close up perspective view of an embodiment of the press-in weather seal of the present invention.

FIG. 7 is an enlarged perspective view of the press-in weather seal 26 of the present invention. The press-in weather seal 26 includes body section 61 having a top side 71, a bottom side 73 opposite the top side, a lateral side 75 adjacent to the top side 71 and the bottom side 73, and a medial side 77 opposite the lateral side 75 and adjacent to the top side 71 and the bottom side 73. The lateral side 75 of the press-in weather seal 26 interfaces with the second inner side wall 18. In the preferred embodiment, the bottom side 73 is tapered so as to narrow in cross-sectional width moving away from the top side 71.

Extending from the body section 61 on the lateral side 75 is a dovetail groove engagement portion 54 that may be pressed into the dovetail groove 22 on the second inner side wall 18 after a glass panel 30 has been installed in the base shoe 12. In some embodiments, the dovetail groove engagement portion 54 may project outwardly from the body section 61 at a right angle or upwardly towards the top side 71.

The lateral side 75 of the press-in seal 26 further comprises a lateral lip 56, which covers any gap between the body section 61 and the inner side wall of the base shoe 12 when the dovetail groove engagement portion 54 is engaged with the dovetail groove 22.

The press-in weather seal 26 may also include a medial lip 60 projecting away from the body section 61 on the medial side 77 along the top side 71, which covers a gap at the glass panel 30 to base shoe interface. In the preferred embodiment, the medial lip 60 is angled upwardly away from the bottom side 73. The press-in weather seal 26 may also include one or more glass scraper seals 58 on the medial side 77, which seals the gap at the glass panel 30 to base shoe 12 interface. In the preferred embodiment, the glass scraper seals 58 may also be angled upwardly towards the top side 71 and away from the bottom side 73.

The body section 61 may further comprise one or more press-in weather seal channels 80 extending the length of the body section 61 to facilitate compressibility of the body section 61.

Figure 8:
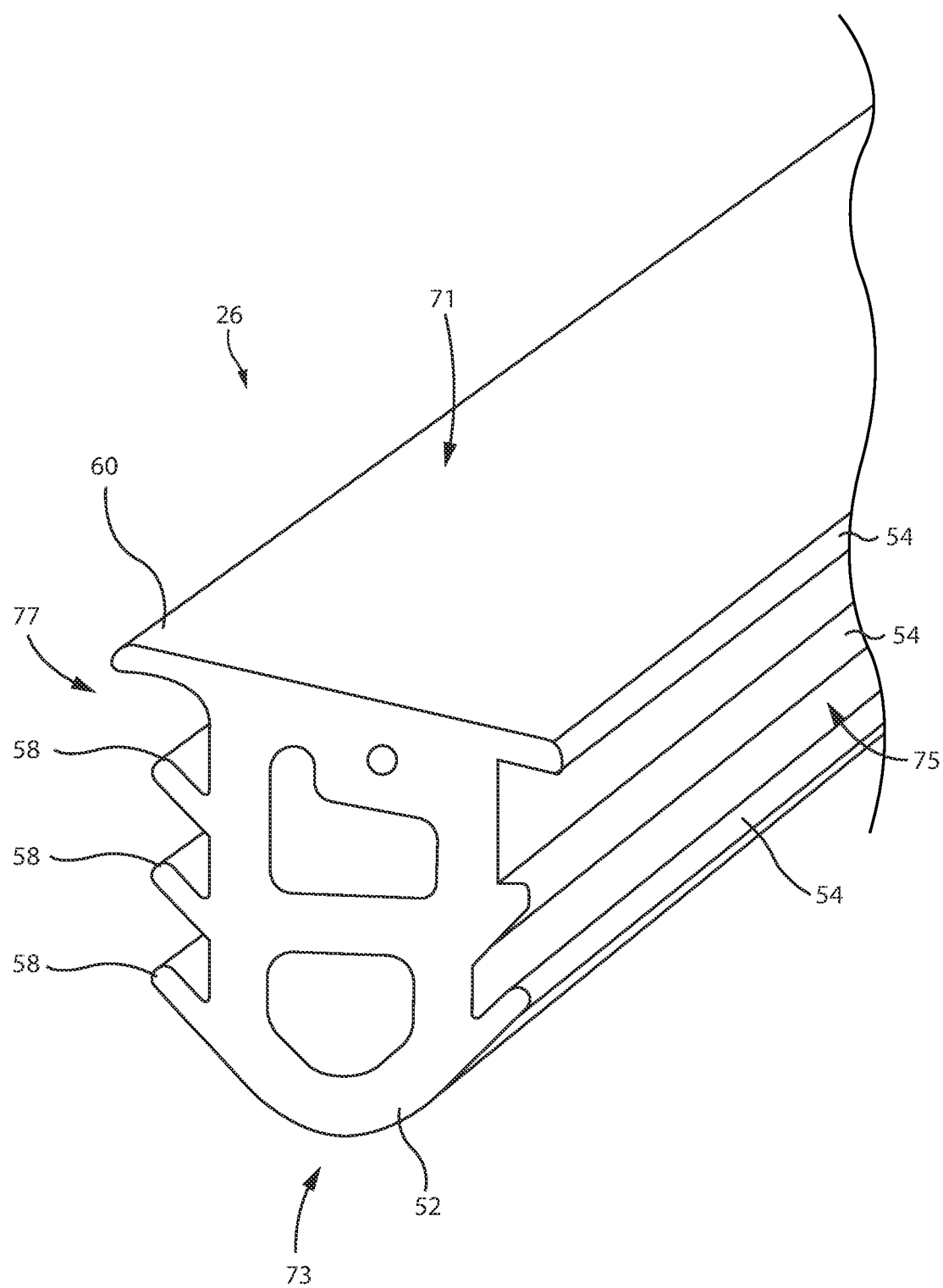
FIG. 8 is a close up perspective view of another embodiment of the press-in weather seal of the present invention.

FIG. 8 shows the press-in weather seal 26 with additional dovetail groove engagement portions 54 as well additional glass scraper seals 58. In the preferred embodiment, the lowest dovetail groove engagement portion 54 and the lowest glass scraper seal 58 may transition into the tapered bottom side 73, thereby forming an arrowhead shape as shown in FIG. 8.

The safety weather seal 24 and press-in weather seal 26 may be made from a variety of elastomeric compounds.

Figure 9:
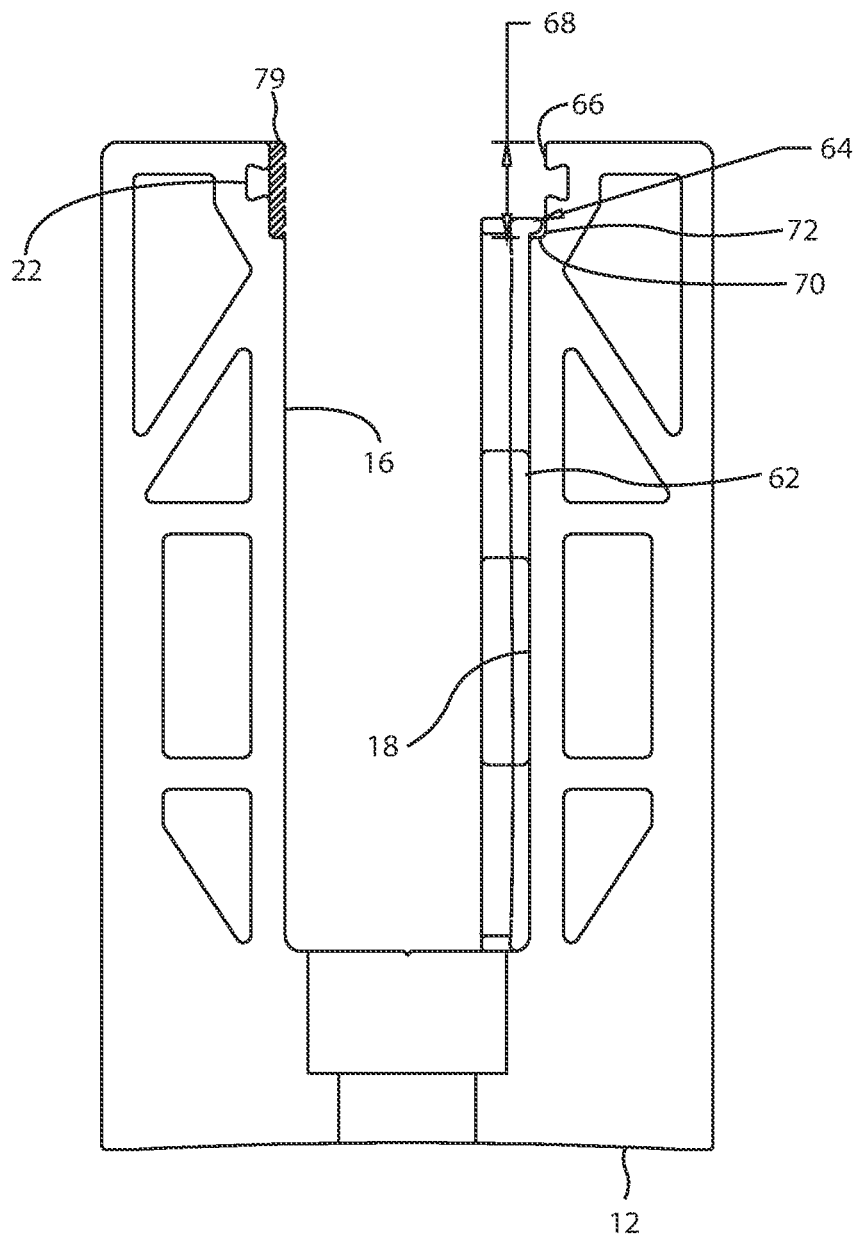
FIG. 9 is an elevation view of a base shoe viewed from one end with the taper plate installed.
Figure 10:
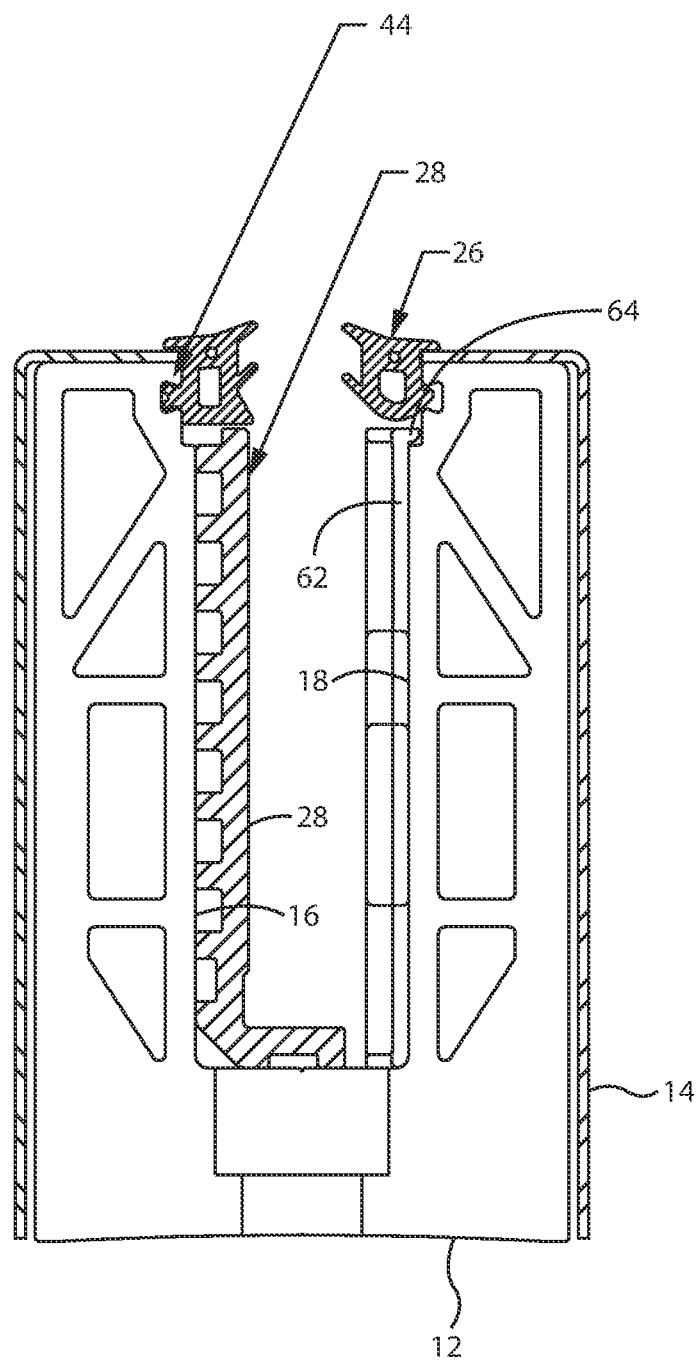
FIG. 10 is an elevation view of a base shoe viewed from one end without the glass panel.

With reference to FIGS. 9 and 10, additional features of the improved shoe assembly 10 of the present invention are shown while other components have been removed for clarity. FIGS. 9 and 10 show the improved taper plates 62, which feature a continuous projection 64 along a top surface of the taper plate 62. The projection 64 rests in a recess 66 formed into the second inner Gall 18 of the base shoe 12. The recess 66 has a recess depth 68 and a recess width 70. The taper plate 62, equipped with the projection 64, and the recess depth 68 of the recess 66, are configured such that there is a small gap 72 between the edge of the projection 64 and the second inner side wall of the base shoe 12. Experimentation has shown that a recess width 70 of 1/32 inch and a recess depth 68 of 5/16 inch are suitable dimensions for the recess 66. The projection 64 in combination with the gap 72 between the projection and the interior face of the second side wall 18 of the base shoe 12 provides a prying surface that allows an installer to insert a prying device into the gap and pry against the projection 64 to separate the taper plate 62 from the second side wall of the base shoe 12.

The show assembly may also comprise a groove cover 79 for when the dovetail grooves are not in use. The groove cover 79 can be placed over the dovetail grooves 22 and may extend along the full length of the dovetail groove.

With reference to FIG. 10, with regard to the recess depth 68 of the recess 66 on the second inner side wall 18 of the base shoe 12, a depth of 5/16 inch to 3/8 inch has been found by experimentation to work well with the improved base shoe 12 and taper plate 62 of the present invention. The recess depth 68 also allows for the use of larger more effective weather seals.

With reference to FIG. 4, a representation of decorative cladding 14 which may be placed on the improved base shoe 12 of the present invention is shown. The decorative cladding will typically be made from stainless steel, brass, anodized aluminum or other material having a visually attractive surface finish.

The foregoing detailed description and appended drawings are intended as a description of the presently preferred embodiment of the invention are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

What is claimed is:

1. A shoe assembly, comprising:
   a. a base shoe, comprising:
      a first inner side wall,
      a second inner side wall, and a bottom wall, the first inner side wall, second inner side and bottom wall defining a base shoe channel;
      a first dovetail groove formed in the first inner side wall and
      a second dovetail groove formed in the second inner side wall; and
   b. a continuous setting strip comprising a top arm, a bottom arm and, a channel for the receipt of a first continuous tape strip, wherein the continuous setting strip is positioned inside the base shoe channel and the first continuous tape strip secures the continuous setting strip to the base shoe.

2. The shoe assembly of claim 1, further comprising a second continuous tape strip mounted on the bottom arm of the continuous setting strip.

3. The shoe assembly of claim 1, further comprising a safety weather seal, the safety weather seal comprising:

a. a dovetail groove engagement portion extending from a lateral side of the safety weather seal, the dovetail groove engagement portion terminating at a pair of opposing projections configured to engage the first dovetail groove;
b. a lateral lip protruding from a top side of the safety weather seal on the lateral side adjacent to the dovetail groove engagement portion; and
c. at least one medial glass scraper seal protruding from a medial side of the safety weather seal.

4. The shoe assembly of claim 1, further comprising a press-in weather seal, the press-in weather seal comprising:
   a. a dovetail groove engagement portion extending from the press-in weather seal on a lateral side of the press-in weather seal to engage the second dovetail groove;
   b. a lateral lip for covering a gap between the press-in weather seal and the second inner side wall of the base shoe when the dovetail groove engagement portion is engaged with the second dovetail groove;
   c. a medial lip projecting away from the press-in weather seal at a top side of the press-in weather seal; and
   d. at least one glass scraper seal extending from a medial side of the press-in weather seal opposite the lateral side.

5. A shoe assembly, comprising:
   a. a base shoe, comprising:
      a first inner side wall,
      a second inner side wall,
      a bottom wall, the first inner side wall, second inner side and bottom wall defining a base shoe channel;
      a first dovetail groove formed in the first inner side wall and
      a second dovetail groove formed in the second inner side wall; and
   b. a continuous setting strip comprising a top arm, a bottom arm and a channel for the receipt of a first continuous tape strip, wherein the continuous setting strip is positioned inside the base shoe channel and the first continuous tape strip secures the continuous setting strip to the base shoe; and
   c. a safety weather seal, comprising:
      i. a body section having a top side, a bottom side, a lateral side, and a medial side, and
      ii. a dovetail groove engagement portion extending from the lateral side of the body section, the dovetail groove engagement portion terminating at a pair of opposing projections for engaging the first dovetail groove.

6. The shoe assembly of claim 5, wherein the safety weather seal further comprises a lateral lip protruding frons the top side of the body section on the lateral side adjacent to the dovetail groove engagement portion.

7. The shoe assembly of claim 5, wherein the safety weather seal further comprises at least one medial glass scraper seal protruding from the medial side.

8. The shoe assembly of claim 5, wherein the safety weather seal further comprises one or more safety weather seal channels extending a length of the body section.

9. The shoe assembly of claim 5, wherein the bottom side of the safety weather seal is tapered.

10. The shoe assembly of claim 6, further comprising a press-in weather seal, the press-in weather seal comprising:
   a. a body section having a top side, a bottom side, a lateral side, and a medial side, wherein the bottom side is tapered;
   b. a dovetail groove engagement portion extending from the body section on the lateral side;

c. a lateral lip projecting away from the body section for covering a gap between the body section and the second inner side wall of the base shoe when the dovetail groove engagement portion is engaged with the second dovetail groove; and d. at least one glass scraper seal extending from the medial side of the body section.

11. The shoe assembly of claim 5, further comprising a second continuous tape strip mounted on the bottom arm of the continuous setting strip.

12. A shoe assembly, comprising:
a. a base shoe, the base shoe comprising:
a first inner side wall,
a second inner side wall,
and a bottom wall, the first inner side wall, second inner side and bottom wall defining a base shoe channel;
a first dovetail groove formed in the first inner side wall and
a second dovetail groove formed in the second inner side wall; and
b. a press-in weather seal, the press-in weather seal comprising:
  i. a body section having a top side, a bottom side, a lateral side, and a medial side, and
  ii. a dovetail groove engagement portion extending from the body section on the lateral side for engaging the second dovetail groove; and
c. a continuous setting strip comprising a top arm and a bottom arm, the continuous setting strip positioned inside the base shoe channel and, a channel for the receipt of a first continuous tape strip wherein the first continuous tape strip secures the continuous setting strip to the base shoe.

13. The shoe assembly of claim 12, wherein the press-in weather seal further comprises a lateral lip for covering a gap between the body section and the second inner side wall of the base shoe when the dovetail groove engagement portion is engaged with the second dovetail groove.

14. The shoe assembly of claim 12, wherein the press-in weather seal further comprises a medial lip projecting away from the body section at the top side of the body section of the press-in weather seal.

15. The shoe assembly of claim 12, wherein the press-in weather seal further comprises at least one glass scraper seal extending from the medial side.

16. The shoe assembly of claim 12, wherein the press-in weather seal further comprises at least one press-in weather seal channel extending a length of the body section.

17. The shoe assembly of claim 12, wherein the bottom side of the press-in weather seal is tapered.

18. The shoe assembly of claim 12, further comprising:
a second continuous tape strip mounted on the bottom arm of the continuous setting strip.

19. The shoe assembly of claim 12, further comprising a safety weather seal, the safety weather seal comprising:
a. a body section having a top side, a bottom side, a lateral side and a medial side, and one or more safety weather seal channels extending a length of the body section;
b. a dovetail groove engagement portion extending from the lateral side of the body section, the dovetail groove engagement portion terminating at a pair of opposing projections;
c. a lateral lip protruding from the top side of the body section on the lateral side adjacent to the dovetail groove engagement portion; and
d. at least one glass scraper seal protruding from the medial side.

\* \* \* \* \*